(No Model.)
J. J. MONAHAN.
INCRUSTATION DEVICE.
No. 490,671. Patented Jan. 31, 1893.
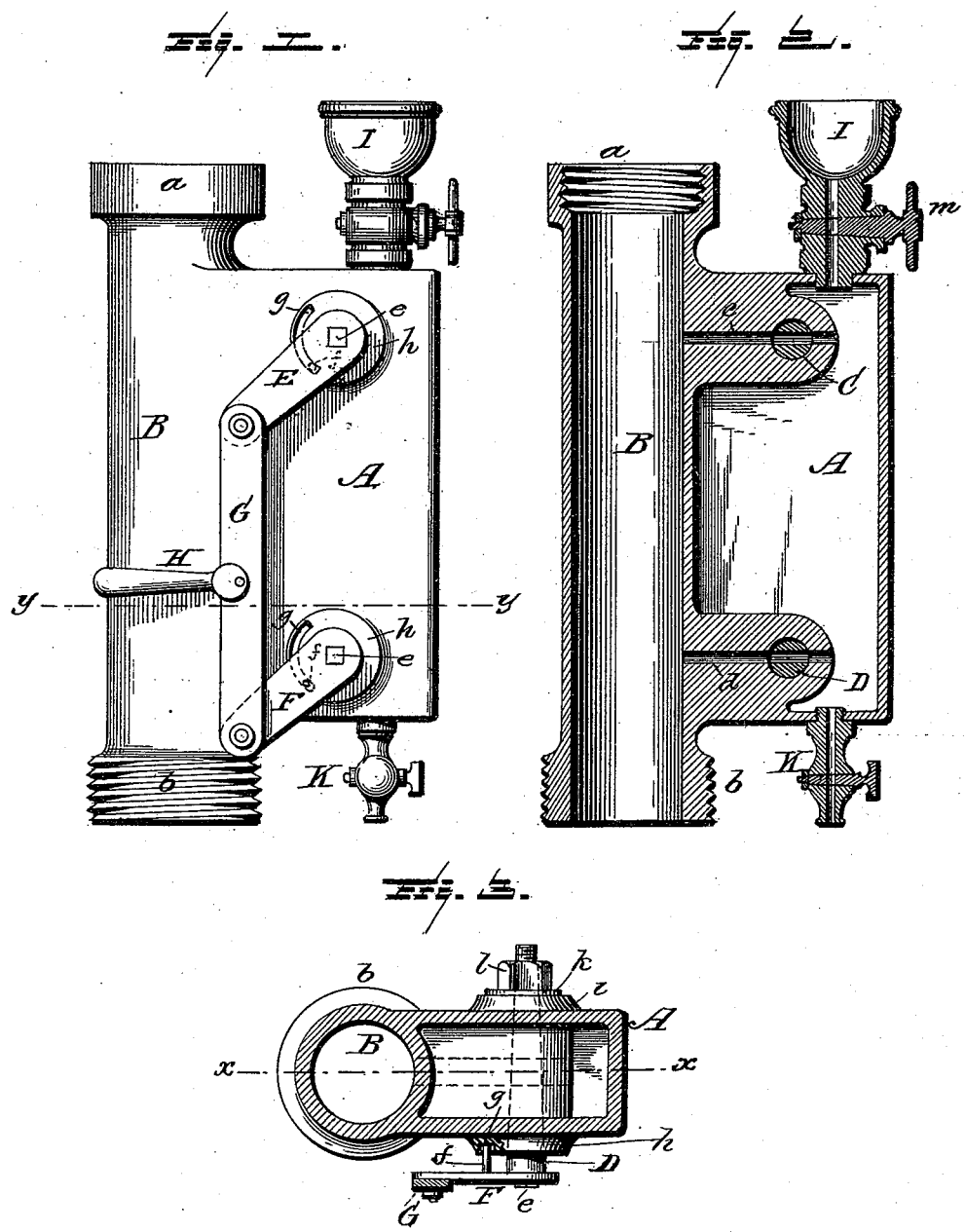
Witnesses
L. C. Hills
Wm Goodwin
Inventor
John J. Monahan.
per Chas. N. Fowler
Attorney

UNITED STATES PATENT OFFICE.

JOHN J. MONAHAN, OF NASHVILLE, TENNESSEE, ASSIGNOR OF ONE-HALF TO EBENEZER BRADLEY, OF SAME PLACE.

INCRUSTATION DEVICE.

SPECIFICATION forming part of Letters Patent No. 490,671, dated January 31, 1893.

Application filed March 8, 1892. Serial No. 424,238. (No model.)

*To all whom it may concern:*

Be it known that I, JOHN J. MONAHAN, a citizen of the United States, residing at Nashville, in the county of Davidson and State of Tennessee, have invented certain new and useful Improvements in Devices for Preventing Incrustation; and I do hereby declare that the following is a full, clear, and exact description of the same, reference being had to the annexed drawings, making a part of this specification, and to the letters of reference marked thereon.

The present invention has relation to that class of devices for feeding oil and other lubricant for preventing incrustation in steam boilers or pumps, and in which oil or other lubricant is injected, in order to prevent the accumulation of sediment coming from the impure water from causing the boiler to scale or crust.

It is the object and purpose of the invention to improve this class of devices for feeding oil and other lubricant in the several details of construction whereby increased effectiveness is secured, and enabling a ready and convenient attachment of the device to the feed or supply pipes where injectors are used as boiler feeders, and to keep said injectors thoroughly lubricated and prevent all openings and passage-ways in the tubes from becoming choked by the sediment coming from impure water. When the usual injector is not in use as a boiler-feeder, the device is of such construction as will enable it to be used successfully as an attachment between the pump and boiler check, thereby keeping the check thoroughly cleaned and preventing the annoyance and trouble that is so commonly caused by the check valves sticking.

The invention therefore consists in a device of the character above referred to constructed substantially as shown in the drawings and hereinafter described and claimed.

Figure 1 of the drawings represents a side elevation of my improved device. Fig. 2 a vertical section taken on line $x$ $x$ of Fig. 3. Fig. 3 a horizontal cross section taken on line $y$ $y$ of Fig. 1.

In the accompanying drawings A represents a suitable chamber for the oil or other lubricant, which chamber may be of any suitable size and shape and of any desired capacity. This chamber A is cast with and is a part of the pipe coupling B, which has at its ends the usual interior and exterior screw threads for connecting thereto the device in the line of the feed-water pipe, either on the supply or discharge side of the feed-water injector or pump.

Suitable passages $c$ $d$ form a communication between the chamber A and the coupling B and said passages are controlled by suitable stop-cocks C D, which are preferably tapering in form and have upon their larger ends an irregular or flat-sided projection $e$ for connecting thereto suitable arms E F respectively. To the outer ends of these arms are pivoted the ends of a lever link G which is provided with a suitable handle H for operating it in opening or closing the passages $c$ $d$ through the medium of the stop-cocks C D. The arms E F have upon their inner side horizontally projecting pins $f$ which engage with segmental grooves $g$ formed in projecting bearings $h$ cast with the chamber A. The grooves $g$ serve as guides for the pins $f$ and the extremities of said grooves serve as stops to limit the movement of the pins and also the stop-cocks in closing or opening the passages $c$ $d$.

Upon the opposite side of the chamber A on line with the projecting bearings $h$ are similar bearings $i$ upon which rest the washers $k$ after the nuts $l$ are engaged with the screw threaded ends of the stop-cocks, as shown in Fig. 3.

With the employment of the arms E F and pivoted lever-link G, a very simple and effective device or means are provided for simultaneously operating the stop-cocks.

The oil chamber A is provided at its top with a suitable oil cup I, through which said chamber is filled with oil or other lubricant, the oil cup having a suitable stop-cock $m$ for controlling the supply to the chamber. When the stop-cocks are turned as indicated in Fig. 2, the passages $c$ $d$ are opened and the oil or other lubricant will pass from the chamber A through the passages and into the coupling B, and thence carried with the steam or water to the boiler.

The chamber A is provided with a suitable drain-cock K, said cock and oil-cup being connected to the chamber in any position desired, to adapt them to the position of the chamber, whether horizontal or vertical.

Having now fully described my invention, what I claim as new and desire to secure by Letters Patent. is:—

1. A device for feeding lubricant for preventing incrustation, consisting in a pipe-coupling casting provided with a chamber upon its side, passages communicating with the chamber and inside of the coupling controlled by the stop-cocks, and means for opening and closing said cocks, substantially as and for the purpose set forth.

2. A device for feeding lubricant for preventing incrustation, consisting in a pipe-coupling casting provided with a chamber upon its side, passages communicating with the chamber and inside of the coupling controlled by stop-cocks, a feed-cock on top and a drip cock on the bottom of the chamber, and means for operating the stop-cock, substantially as and for the purpose described.

In witness whereof I affix my signature, in presence of two witnesses, this 5th day of March 1892.

J. J. MONAHAN.

Witnesses:
BUN J. RAMAGE,
WM. SHOEMAKER.